Feb. 23, 1926.

W. E. MICHAEL

AUTOMATIC DRAINING DEVICE

Filed Dec. 31, 1924

1,574,103

Inventor
Warren E. Michael
by Popp & Powers
Attorneys

Patented Feb. 23, 1926.

1,574,103

UNITED STATES PATENT OFFICE.

WARREN E. MICHAEL, OF BUFFALO, NEW YORK.

AUTOMATIC DRAINING DEVICE.

Application filed December 31, 1924. Serial No. 759,212.

*To all whom it may concern:*

Be it known that I, WARREN E. MICHAEL, a citizen of the United States, residing at Buffalo, in the county of Erie and State of New York, have invented new and useful Improvements in Automatic Draining Devices, of which the following is a specification.

This invention relates to a draining device which is more particularly intended for draining the water from opposite ends of a steam engine cylinder when any condensation of steam occurs and thereby prevent knocking out the ends of the cylinder by the movement of the piston as frequently occurs in the event of water being trapped between the opposite sides of the piston and the end heads of the cylinder.

It is the object of this invention to provide an automatic device for this purpose which will provide communication between opposite ends of the cylinder and the exterior of the same when the engine is at rest and thereby permit any water of condensation to flow therefrom and avoid displacement or driving out of the cylinder heads when the operation of the engine is resumed, which draining device is also so constructed that during the operation of the steam engine it will automatically shut off the escape of steam through the draining device from that end of the cylinder which is receiving live steam for propelling the piston toward the opposite end of the same while the last mentioned end of the cylinder is connected by the draining device with an outlet so as to permit any water of condensation which may be present in the last mentioned end of the cylinder to escape therefrom and thereby avoid driving out the head on the corresponding end of the cylinder by the pressure of the piston.

In the accompanying drawings:—

Similar characters of reference indicate corresponding parts of the several figures.

Figure 1:
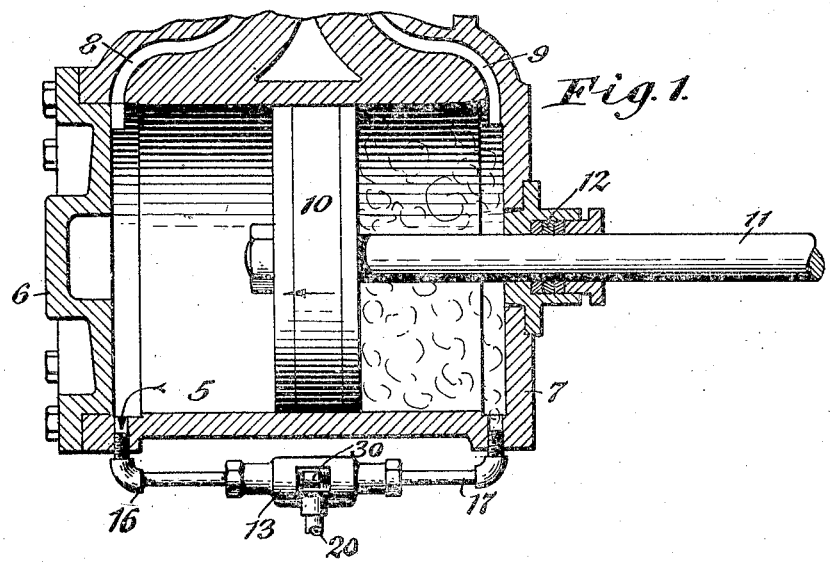
Figure 1, is a longitudinal section of a steam engine cylinder and piston equipped with my invention.

Although this invention is capable of being installed in steam engines and similar structures which may vary in details of construction the same in the present instance is shown in connection with a steam engine having its cylinder composed of a cylindrical body 5, heads 6, 7 which close opposite ends of the body, ports 8 and 9 for alternately delivering live steam and exhausting spent steam from opposite ends of the cylinder, a piston 10 reciprocating in the cylinder and a piston rod 11 connected with this piston and passing through a stuffing box 12 to the exterior thereof and connected in any suitable manner with the means which are to be actuated by the steam engine.

In its preferred form the automatic draining device containing my invention and illustrated in the drawings is constructed as follows:—

The numeral 13 represents the valve body or frame which is provided at its opposite ends and preferably in axial alignment with two outlet chambers 14, 15, the outer ends of which are connected by pipes 16, 17 with the opposite ends of the engine cylinder. On the central parts of the body the same is provided with two outlet ports 18, 19 which preferably lead to a single drain or discharge pipe 20 leading to the sewer or any other desired place where the water drained from the cylinder is discharged. Each of these outlet ports communicates with the inner end of one of the outlet chambers and the latter is provided with an inwardly facing valve seat around the place of communication between the respective outlet chamber and the corresponding outlet port. These valve seats are indicated at 21 and 22 and are preferably of conical form. Arranged within the two outlet chambers are two cut off valves 23, 24 preferably of conical form and each adapted to move toward and from the corresponding valve seat in the respective outlet chamber for the purpose of cutting off communication between each chamber and its outlet port or establishing communication therein. These cut off valves are provided with valve stems 25 and 26, respectively, which are arranged axially in line and project toward each other from the interior of the outlet chambers through guides 27, 28 on the inner parts of the body and into an opening 29 between these guides, which opening is in communication with the exterior of the draining device. The opposing inner ends of the two valve stems 25 and 26 are connected with each other so that they move lengthwise in unison and thereby cause these valves to be so operated that when one of them moves toward its seat the other one moves away from its seat. By this means one end of the engine cylinder will be placed in communication with the outer atmosphere through the drain pipe 20, while the other end of the engine cylinder is cut off therefrom, and vice versa. In the preferred construction the opposing ends of the valve stems are connected by a coupling sleeve 30 having an internal screw thread which engages with corresponding screw threads on the inner ends of the valve stems and after these parts are assembled, unscrewing of these parts relatively to each other, is prevented by cotter pins 31 passing through this coupling sleeve and the two valve stems, as clearly shown in Figures 2 and 3.

When the engine is not in operation and no steam pressure is present in either end of the cylinder the two cut off valves 23 and 24 are held in their central position in which both of them are open, this being preferably accomplished by means of two springs 32, 33 which surround the valve stems and engage with their inner ends against opposite ends of the coupling sleeve 30 while their outer ends engage with the guides 27, 28 which practically form part of the body or frame of the draining device.

When the engine is at rest and both ends of its cylinder are in communication with the external atmosphere by reason of both drain valves being open any water of condensation which may be formed in both ends of the engine cylinder will be permitted to escape therefrom and flow out through both outlet chambers and to the drain pipe 20 of the draining device so that upon subsequently starting the engine no interference from water will occur and no liability of injuring the engine exists.

Figure 2:
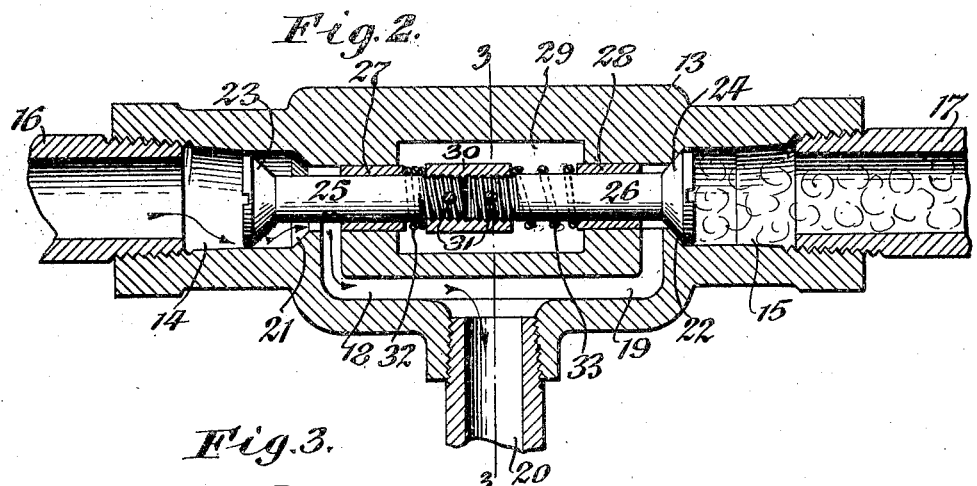
Figure 2, is a vertical longitudinal section, on an enlarged scale, of the automatic draining device embodying my improvements.
Figure 3:
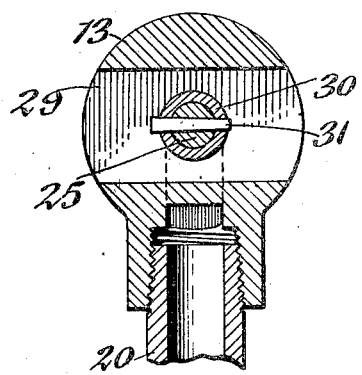
Figure 3, is a cross section of the same taken on line 3—3, Figure 2.

When, however, the engine is running and a pressure of live steam exists in one end of the engine cylinder for driving the piston therein towards the opposite end of the cylinder, part of this live steam passes into the corresponding outlet chamber of the draining device and forces the drain valve therein against its seat thereby preventing the escape of any live steam from the working end of the engine through the draining device. As the pressure of the live steam moves the outlet valve corresponding to the working end of the engine cylinder against its seat the other drain valve in the opposite outlet chamber communicating with the opposite end of the engine cylinder is moved away from its seat, thereby uncovering the outlet port of this last mentioned chamber and permitting any water of condensation which may be present in the exhaust end of the engine cylinder to flow through the corresponding outlet chamber and outlet port to the drain pipe 20. This position of the two valves of the draining device is indicated in Figure 2.

Upon now reversing the steam and exhaust connections of the engine cylinder so as to admit steam into that end of the cylinder which has just exhausted and permitting the spent steam from the opposite end of the cylinder to escape to the atmosphere. Part of the steam admitted to that end of the engine cylinder which is now the working end will pass into the outlet chamber which previously served to drain the water of condensation to the drain pipe 20, thereby causing the valve therein to be forced to its seat and prevent the escape of steam while the other valve is simultaneously moved away from its seat so as to permit any water of condensation from the opposite or exhaust end of the cylinder to pass this open valve and run to the corresponding outlet port and to the drain pipe 20.

This reversal of the operation of the valves of the draining device occurs with every stroke of the engine cylinder due to the admission of live steam alternately into opposite ends of the engine cylinder which simultaneously causes the two draining valves to be automatically shifted alternately by steam pressure in the direction for cutting off communication between the live or working end of the engine cylinder and the atmosphere and thus preventing waste of steam while at the same time the opposite dead or exhaust end of the cylinder is placed in communication with the drain pipe or atmosphere so as to permit a free discharge of water of condensation from the same and avoid any damage to the engine which otherwise would be the result.

This automatic draining device is very simple and inexpensive in construction, it is positive and reliable in its operation, it is compact in construction so that it does not take up room which is required for other purposes and it can be readily installed on engines of standard construction without requiring any alteration therein.

I claim as my invention:—

An automatic draining device for opposite ends of a steam engine cylinder, comprising two outlet chambers each adapted to be connected with one end of the engine cylinder and each provided with an outlet port and a valve seat around said outlet port, valves arranged in said chambers and each movable toward and from the respective valve seat for closing and opening the corresponding outlet port, a connection between said valves for causing one of said valves to open while the other closes consisting of valve stems arranged axially in line on said valves and projecting through said chambers to the exterior thereof and toward each other, a coupling sleeve having a screw connection with the outer ends of said stems, and springs each surrounding one of said stems and bearing at one end against said coupling sleeve and at its other end against the adjacent part of the corresponding outlet chamber.

WARREN E. MICHAEL.